United States Patent
Bledsoe et al.

(10) Patent No.: US 7,864,941 B1
(45) Date of Patent: Jan. 4, 2011

(54) MODIFYING CALL SYSTEM IDENTIFIERS TO INDICATE KEYS ASSOCIATED WITH USER INFORMATION

(75) Inventors: Gary P. Bledsoe, Blue Springs, MO (US); Kevin Agee, Kansas City, MO (US); Terri Potter, Overland Park, KS (US)

(73) Assignee: Sprint Communications Company L.P., Overland, KS (US)

( * ) Notice: Subject to any disclaimer, the term of this patent is extended or adjusted under 35 U.S.C. 154(b) by 1281 days.

(21) Appl. No.: 11/416,536

(22) Filed: May 3, 2006

(51) Int. Cl.
*H04M 3/42* (2006.01)

(52) U.S. Cl. .................. 379/207.15; 379/201.01; 379/142.01; 379/88.21; 379/88.2

(58) Field of Classification Search .......... 379/207.15, 379/88.2, 88.21, 142.01, 201.01
See application file for complete search history.

(56) References Cited

U.S. PATENT DOCUMENTS

| 6,018,668 | A  | * | 1/2000  | Schmidt ................. 455/518 |
| 6,252,953 | B1 |   | 6/2001  | Gruchala et al. |
| 6,411,692 | B1 |   | 6/2002  | Scherer |
| 2004/0203629 | A1 | * | 10/2004 | Dezonno et al. ......... 455/414.1 |
| 2006/0203990 | A1 | * | 9/2006  | Cope et al. ............ 379/265.02 |

* cited by examiner

*Primary Examiner*—Quynh H Nguyen

(57) ABSTRACT

A call processing system comprises an interface and a processing system. The interface is configured to receive call signaling for a call from a call system and receive user information during the call from a user using the call system wherein the call signaling includes an identifier for the call system. The processing system is configured to generate a key for the call, modify the identifier to generate a modified identifier indicating the key, transfer the key and the user information to a database system, and transfer new call signaling for the call to a destination wherein the new call signaling indicates the modified identifier.

19 Claims, 10 Drawing Sheets

MODIFYING CALL SYSTEM IDENTIFIERS TO INDICATE KEYS ASSOCIATED WITH USER INFORMATION

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The field of the invention relates to telecommunications, and in particular, to modifying call system identifiers to indicate keys associated with user information.

2. Description of the Prior Art

Interactive voice response (IVR) units are often times used to provide preliminary interaction with callers to call centers. For example, IVRs are typically capable of providing interactive menus to callers. Often times, callers provide input and user information in the form of touch tones or spoken words. One important capability of most IVRs is routing calls to the appropriate destination, such as to a call center or an agent station within a call center. When routing a call to a destination, an IVR must be capable of transferring any user information that has been collected during the call. FIGS. 1-4 illustrate two examples in the prior art for transferring user information collected by an IVR to a call center.

FIG. 1 illustrates communication network 100 in an example of the prior art. In this example, communication network 100 includes call center 120, IVR 130, caller 131, and database 140. IVR is coupled to database 140 over connection 101 and to call center 120 over connection 103. Database 140 is coupled to call center 120 over connection 102. Caller 131 is coupled to IVR over connection 104.

FIG. 2 illustrates the operation of communication network 100 in an example of the prior art. First, an automatic number identification (ANI) number identifying the phone number or calling number of caller 131 is passed from caller 131 to IVR 130 during call setup. During the call, caller 131 also provides user information, such as personal identification information, sales information, or the like, to IVR 130.

At a point during the call, IVR 130 determines to route caller 131 to call center 120. In order to pass the collected user information to call center 120, IVR 130 first transfers the user information along with the ANI to database 140. Database 140 stores the user information in association with the ANI for later access.

Next, IVR 130 out-dials call center 120. In a process well known in the art, IVR 130 provides the original ANI of caller 131 as part of the call setup process for the out-dialed call to call center 120. Typically, the ANI is passed within standard SS7 call signaling messages. Call center 120 receives the incoming call, including the call signaling, and queries database 140 using the ANI. Database 140 retrieves the user information stored in association with the ANI and returns the user information to call center 120. Eventually, the call is connected from caller 131 to call center 120 and the user information can be used for further call operations.

Unfortunately, communication network 100 presents several problems when multiple calls having a common ANI are placed simultaneously to IVR 130. For example, multiple callers from multiple extensions may share a single ANI. Such a situation is problematic because the respective user information for each multiple user will be stored in association with a non-unique ANI in database 140, thereby causing confusion at call center 120 or preventing the retrieval of user information entirely.

FIG. 3 illustrates communication network 100, with the addition of connection 105, a prior art solution to the problem presented by FIGS. 1-2. In FIG. 3, IVR 130 is coupled to call center 120 by connection 103 and connection 105. Connection 105 is a data connection over which data can be passed from IVR 130 to call center 120.

FIG. 4 illustrates the operation of communication network 100 in an example of the prior art. In this example, an automatic number identification (ANI) number identifying the phone number or calling number of caller 131 is passed from caller 131 to IVR 130 during call setup. During the call, caller 131 also provides user information, such as personal identification information, sales information, or the like, to IVR 130.

At a point during the call, IVR 130 determines to route caller 131 to call center 120. In order to pass the collected user information to call center 120, IVR 130 first generates a key to identify the call. Next, IVR 130 transfers the user information along with the key to database 140. Database 140 stores the user information in association with the key for later access. In this manner, multiple calls from a single ANI can be identified uniquely by unique keys.

In response to determining the call requires further routing, IVR 130 out-dials call center 120. While the call is connected over connection 103, IVR 130 also passes the key to call center 120 over connection 105. Call center 120 receives the incoming call over connection 103 and the key over connection 105. Call center 120 then queries database 140 using the key. Database 140 retrieves the user information stored in association with the key and returns the user information to call center 120. Eventually, the call is connected from caller 131 to call center 120 and the user information can be used for further call operations.

Problematically, maintaining multiple connections 103 and 105 is expensive and complex. For example, data connection 105 requires data interface at IVR 130 and call center 120, in addition to the standard connection interface require for connection 103. Furthermore, supporting a data connection between IVR 130 and call center 120 requires valuable manual hours and expertise.

SUMMARY OF THE INVENTION

An embodiment of the invention helps solve the above problems and other problems by providing systems and methods that allow for correlating user information to multiple callers respectively that share common call system identifiers, such as a common ANI. In an advantage, the expense of additional data channels is eliminated. In addition, the confusion associated with multiple callers calling from the same ANI is eliminated.

In an embodiment of the invention, a call processing system comprises an interface and a processing system. The interface is configured to receive call signaling for a call from a call system and receive user information during the call from a user using the call system wherein the call signaling includes an identifier for the call system. The processing system is configured to generate a key for the call, modify the identifier to generate a modified identifier indicating the key, transfer the key and the user information to a database system, and transfer new call signaling for the call to a destination wherein the new call signaling indicates the modified identifier.

In an embodiment of the invention, the call signaling comprises automatic number identification (ANI) information and wherein the ANI information includes the identifier and wherein the processing system is configured to modify the ANI information to generate the modified identifier.

In an embodiment of the invention, the identifier comprises a phone number for the call system and wherein the modified identifier comprises a modified phone number.

In an embodiment of the invention, the processing system is configured to modify a portion of the phone number to generate the modified phone number having a modified portion.

In an embodiment of the invention, the new call signaling comprises new automatic number identification (ANI) information indicating the modified phone number.

In an embodiment of the invention, the modified portion of the modified phone number indicates the key.

In an embodiment of the invention, a method of operating a call processing system comprises receiving call signaling for a call from a call system and receive user information during the call from a user using the call system wherein the call signaling includes an identifier for the call system, generating a key for the call, modifying the identifier to generate a modified identifier indicating the key, transferring the key and the user information to a database system, and transferring new call signaling for the call to a destination wherein the new call signaling indicates the modified identifier.

In an embodiment of the invention, a communication system comprises a call processing system, a database system, and a destination system. The call processing system is configured to receive call signaling for a call from a call system and receive user information during the call from a user using the call system wherein the call signaling includes an identifier for the call system, generate a key for the call, modify the identifier to generate a modified identifier indicating the key, transfer the key and the user information to a database system, and transfer new call signaling for the call to a destination system wherein the new call signaling indicates the modified identifier. The database system is coupled to the call processing system and is configured to receive key and user information, store the user information in association with the key, receive a query indicating the key, and transfer a response indicating the user information. The destination system is coupled to the call processing system and the database system and is configured to receive the new call signaling, transfer the query to the database system, and receive the user information from the database system in response to the query.

In an embodiment of the invention, the call processing system comprises an interactive voice response (IVR) unit and the destination system comprises a call center.

BRIEF DESCRIPTION OF THE DRAWINGS

The same reference number represents the same element on all drawings.

DETAILED DESCRIPTION OF THE PREFERRED EMBODIMENT

FIGS. 5-10 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

FIGS. 5-7

Figure 1:
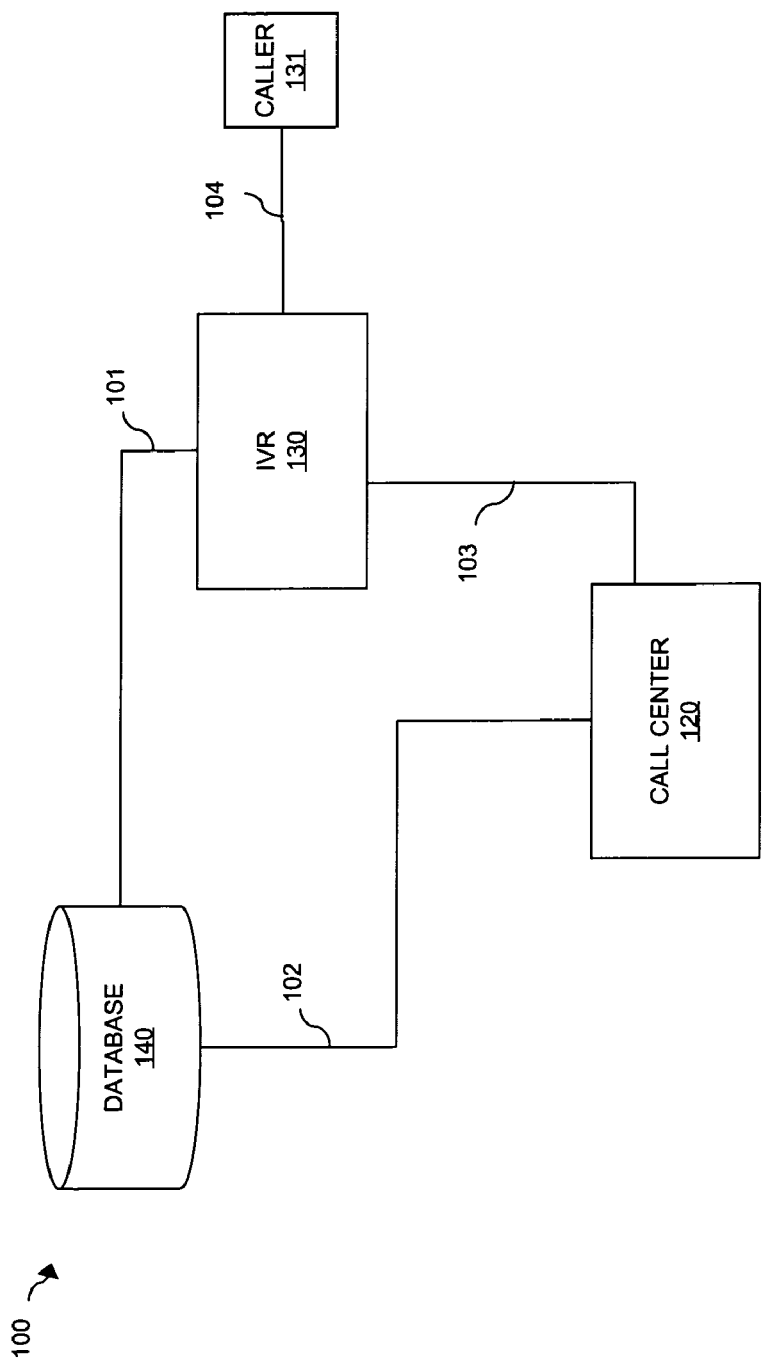
FIG. 1 illustrates a communication system in an example of the prior art.
Figure 2:
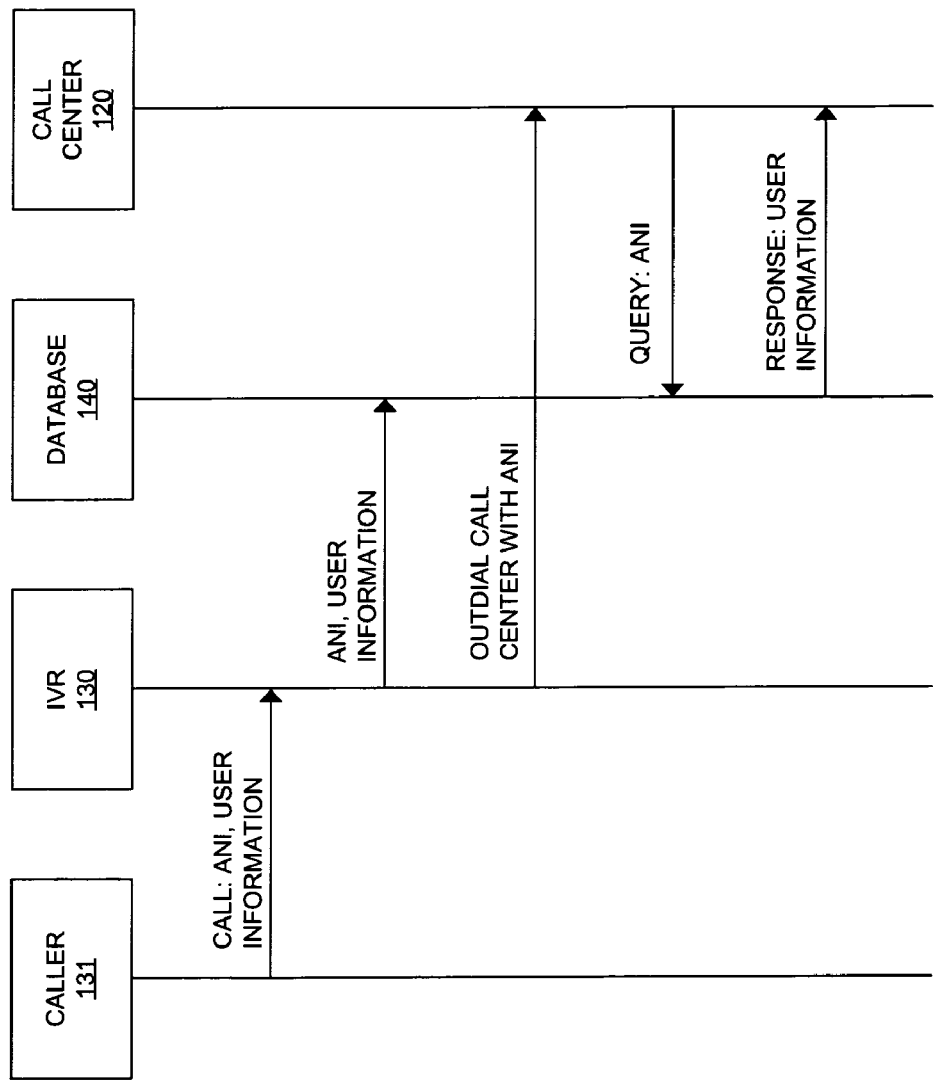
FIG. 2 illustrates the operation of a communication system in an example of the prior art.
Figure 3:
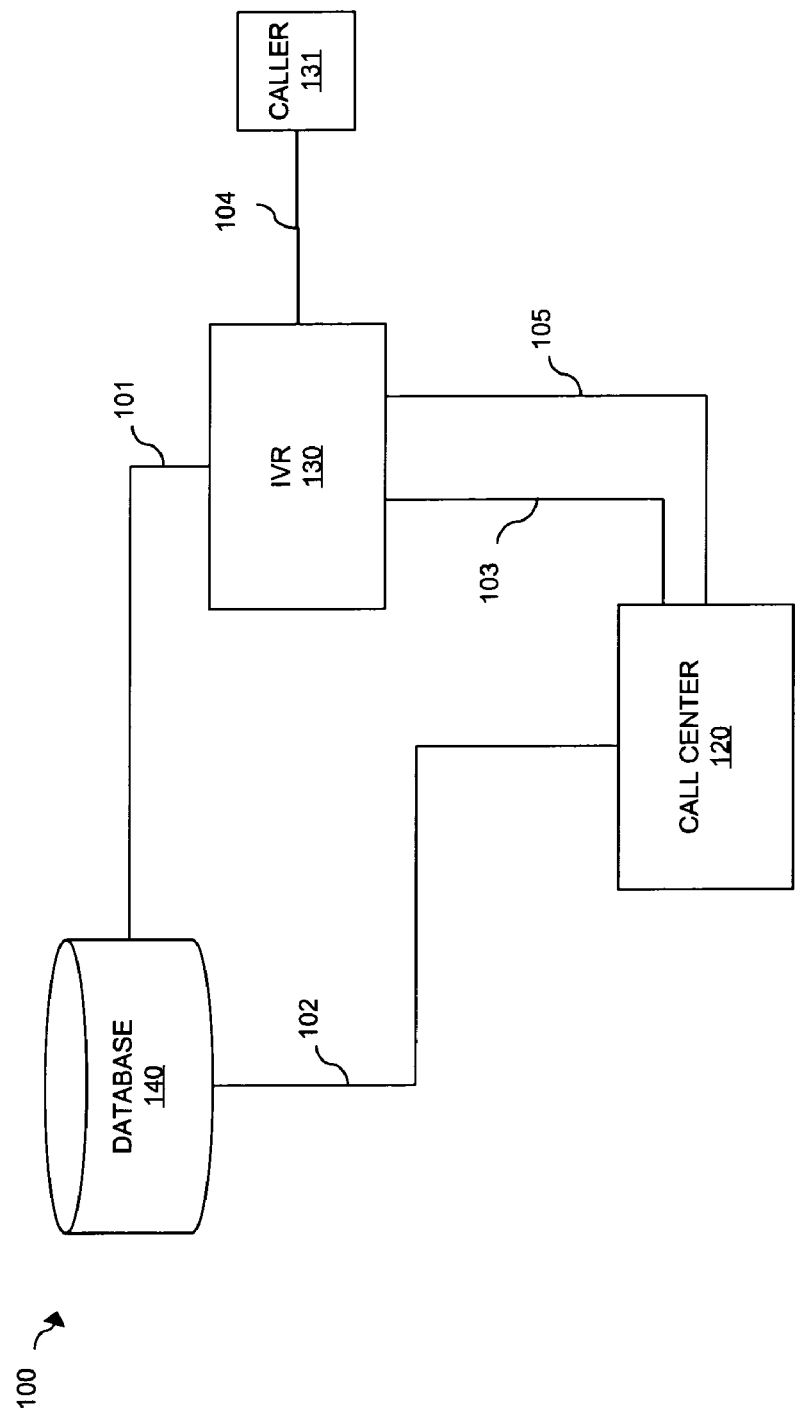
FIG. 3 illustrates a communication system in an example of the prior art.
Figure 4:
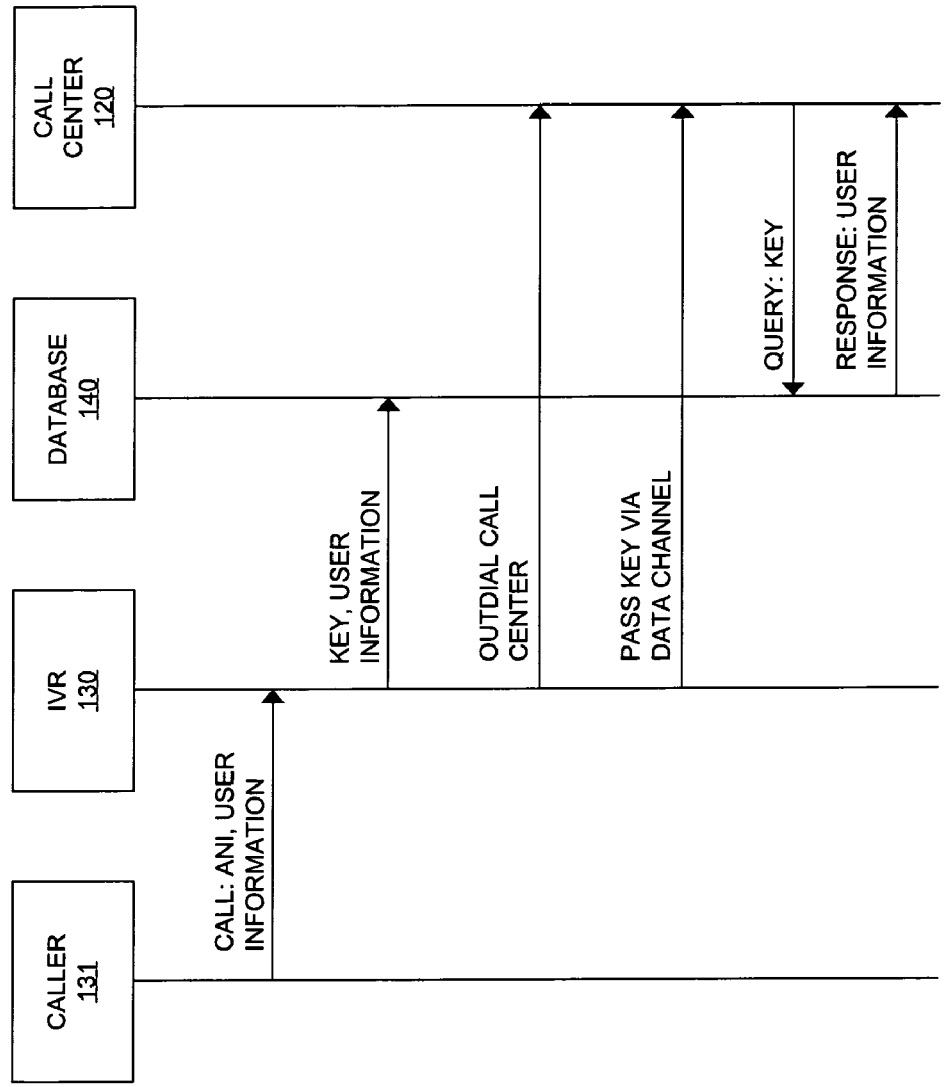
FIG. 4 illustrates the operation of a communication system in an example of the prior art.
Figure 5:
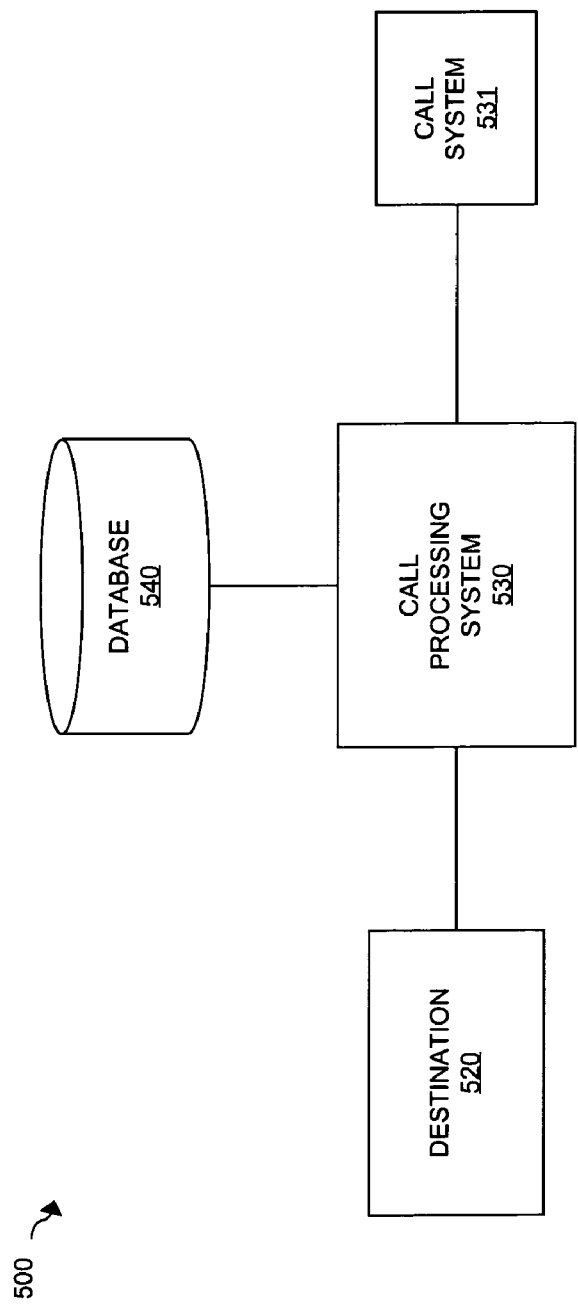
FIG. 5 illustrates a communication system in an embodiment of the invention.

FIG. 5 illustrates communication system 500 in an embodiment of the invention. Communication system 500 provides for uniquely identifying individual calls by keys, storing user information collected over the calls in association with the keys, and providing the keys to destination systems through the use of a modified call system identifiers within call signaling transmissions. In an advantage, the need for expensive and inefficient back data channels is eliminated. In addition, the ability to correlate user information with calls originating from a common call system identifier is provided.

Communication system 500 includes call processing system 530, call system 531, database 540, and destination 520. Call system 531 is operatively coupled to call processing system 530. Database system 540 is also operatively coupled to call processing system 530. Destination 520 is also operatively coupled to call processing system 530.

Figure 6:
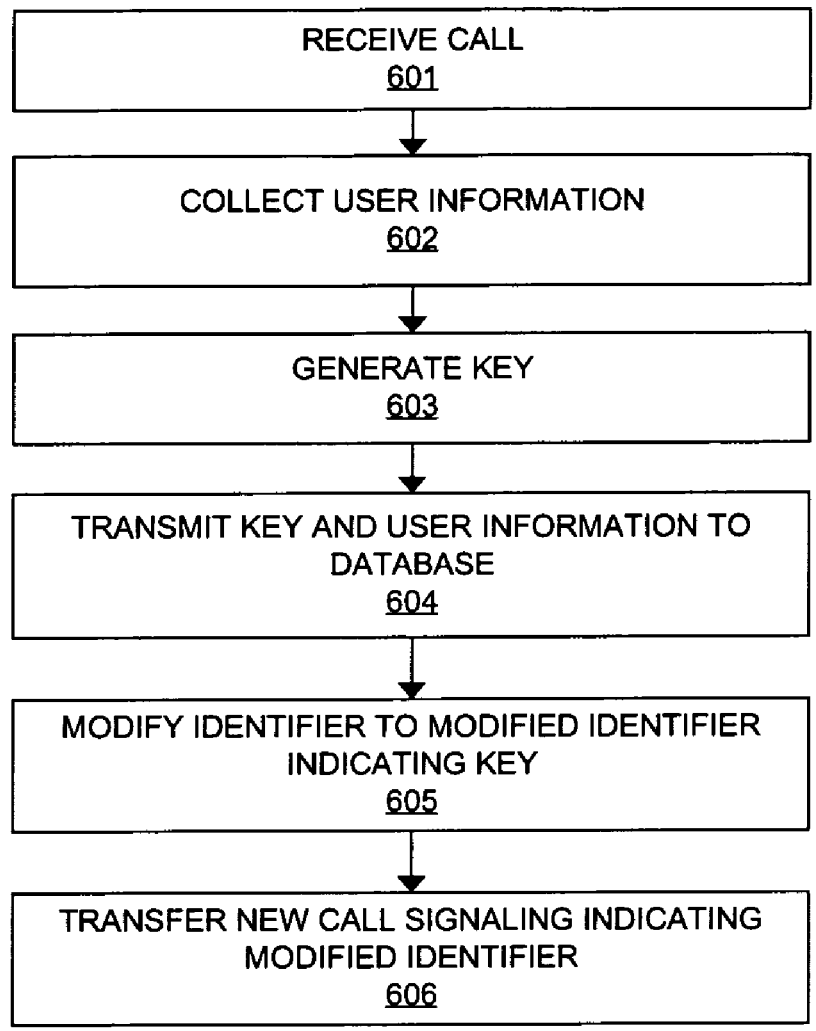
FIG. 6 illustrates the operation of a call processing system in an embodiment of the invention.

FIG. 6 illustrates a process executed by call processing system 530 in an embodiment of the invention. To begin, call processing system 530 receives a call including call signaling for a call from call system 531 (Step 601). The call signaling includes an identifier that identifies call system 531. During the call, call processing system 530 collects user information (Step 602). At a point during the call, it is determined that the call should be routed to destination 520. At that point, call processing system 530 generates a key for the call (Step 603). Next, call processing system 530 transfers the key and the user information to database 540 (Step 604). Call processing system 530 then processes the identifier to modify the identifier (Step 605). The modified identifier indicates the key. Call processing system 530 then transfers new call signaling to route the call to destination 520 wherein the new call signaling indicates the modified identifier (Step 606).

Figure 7:
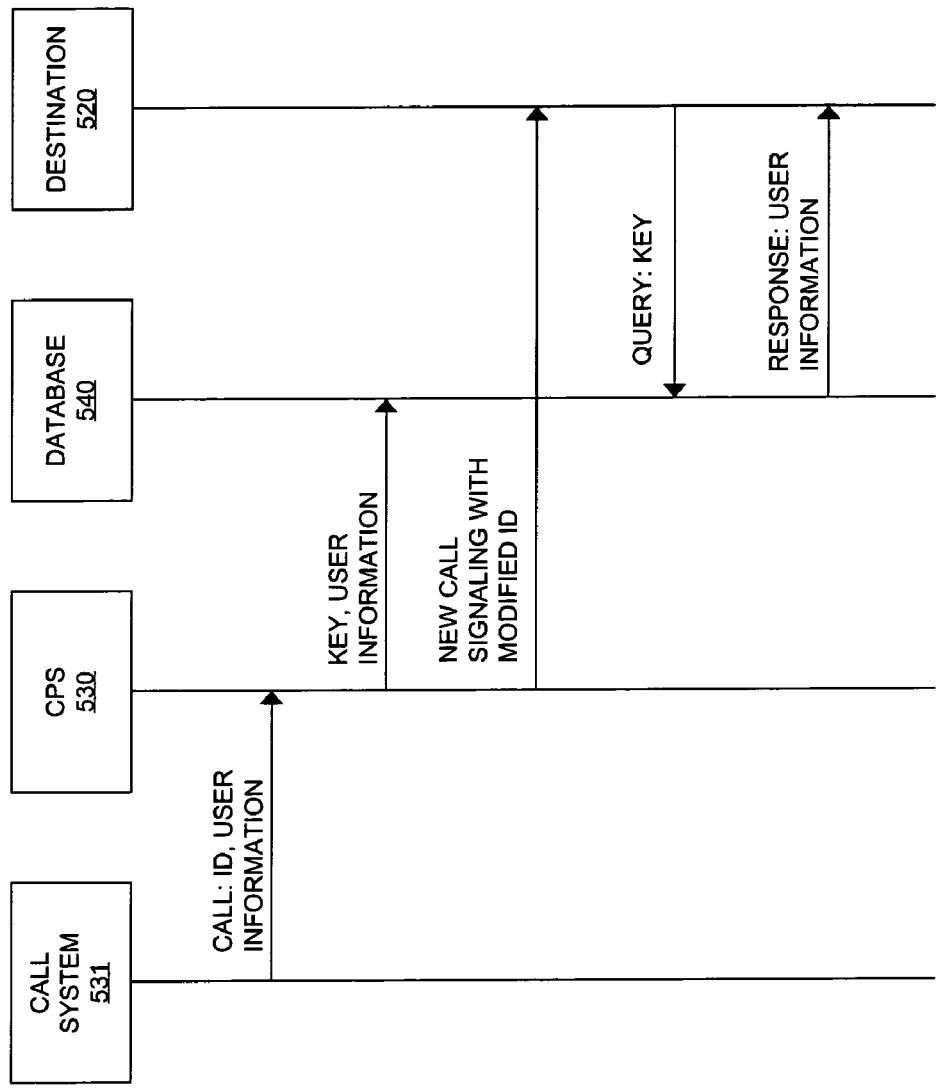
FIG. 7 illustrates the operation of a communication system in an embodiment of the invention.

FIG. 7 illustrates a flow diagram in an embodiment of the invention. As illustrates, a call is initiated and setup between call system 531 and call processing system (CPS) 530. During call setup, call signaling is transferred from call system 531 to call processing system 530. It should be understood that call system 531 could be comprised of multiple devices, systems, sub-systems, or the like, wherein at least one of the devices, systems, or sub-systems is capable of providing call signaling to call processing system 530. The call signaling includes an identifier that identifies the caller, such as by a phone number, billing number, or other such identifier.

During the call, call processing system 530 collects user information from the caller. At a point during the call, it is determined that the call should be routed to destination 520. Call processing system 530 responsively generates a key to associate with the call and transfers the key and the user information to database 540. Database 540 stores the user information in association with the key. Next, call processing system 530 processes the identifier to generate a modified identifier that indicates the key. Call processing system 530 generates and transfers new call signaling to route the call to destination 520. The new call signaling indicates the modified identifier. Upon receiving the call signaling, destination 520 transfers a query to database 540 indicating the key. Database 540 responsively retrieves the user information stored in association with the key and returns a response including the user information to destination 520.

Advantageously, communication system 500 allows for correlating user information to multiple callers respectively that share common call system identifiers. In an advantage, the expense of additional data channels is eliminated. In addition, the confusion associated with multiple callers having the same call system identifier is eliminated.

Second Embodiment Configuration and Operation

Figure 8:
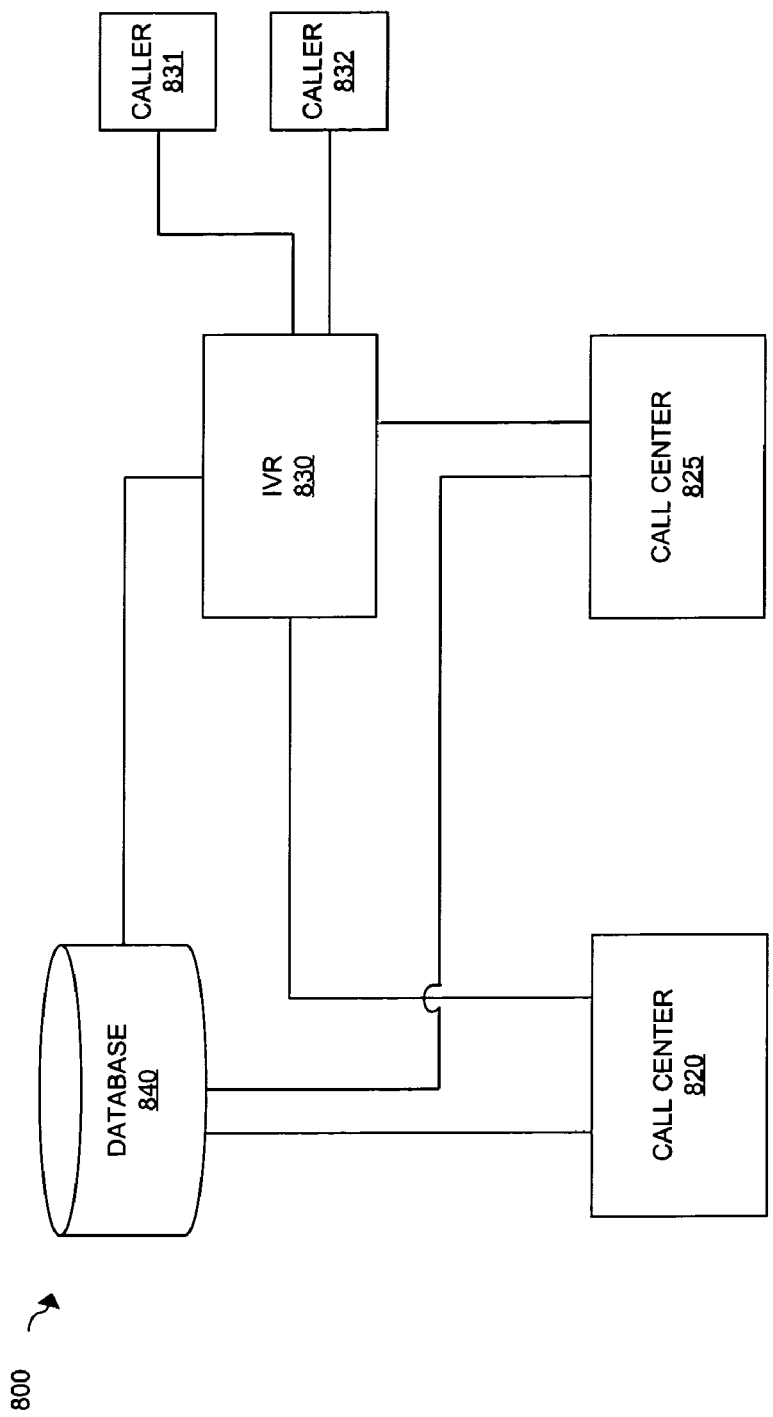
FIG. 8 illustrates a communication system in an embodiment of the invention.
Figure 9:
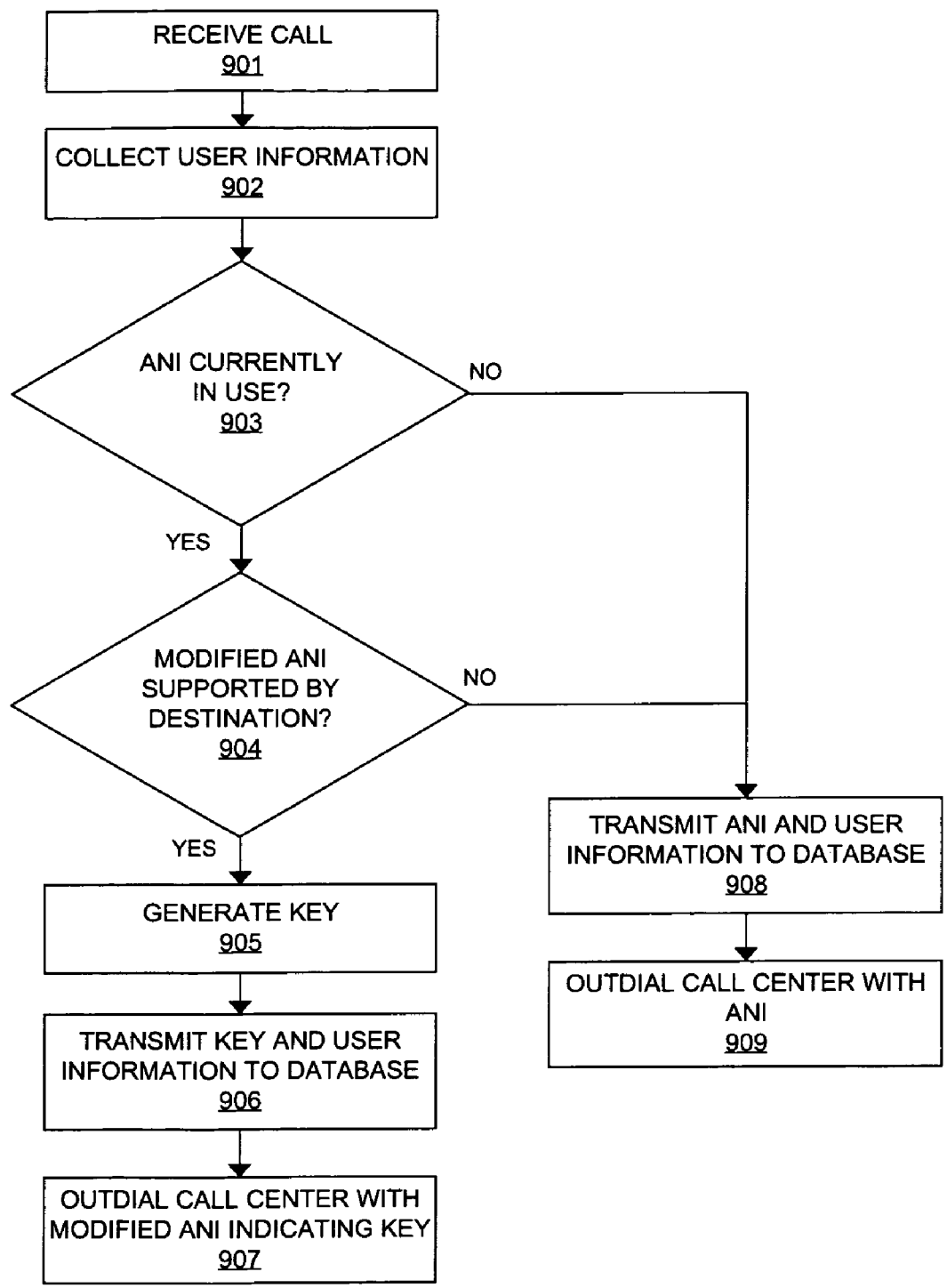
FIG. 9 illustrates the operation of an interactive voice response unit in an embodiment of the invention.

FIGS. 8 and 9

FIG. 8 illustrates communication system 800 in an embodiment of the invention. Communication system 800 includes caller 831, caller 832, interactive voice response unit (IVR) 830, database system 840, call center 820, and call center 825. Call centers 820 and 825 could include various elements, such as agent stations, phones, work stations, servers, and public branch exchanges. Call centers are well known in the art. Callers 831 and 832 are operatively in communication with call processing system 830. Callers 831 and 832 could be, for example, telephones, work stations, or the like. Callers 831 and 832 could be connected to call processing system 830 over a telecommunication network, such as the public switched telephone network (PSTN), a packet communication network, or a combination of such networks. Other connections are possible. Database 840 is operatively coupled to IVR 830. Likewise, call centers 820 and 825 are operatively coupled to IVR 830. An example of database 840 is the Tandem Alpha Generic Server.

FIG. 9 illustrates the operation of IVR 830 in an embodiment of the invention. To begin, IVR 830 receives a call and call signaling for the call (step 901). The call signaling indicates automatic number identification (ANI) information associated with the caller. In this embodiment, the caller it is assumed that the caller is caller 831. During the call, IVR 830 collects user information (Step 902). Examples of user information include personal identification, such as a social security number, customer number, or order number. Other information is possible.

At any point during the call, it is determined that the call should be routed to call center 820. Next, IVR 830 determines if the ANI received in the call signaling is already in use (Step 903). For example, caller 832 could share the same ANI as caller 831. Such a situation could occur if caller 831 and 832 were each located at a common location, such as an office or enterprise. If the ANI is already in use, call processing system 904 determines if a modified ANI process is supported by the selected call center 820 (Step 904).

If the selected call center 820 does not support the modified ANI process, IVR 830 transmits the original ANI and user information to database 840 (Step 908). Next, IVR 830 out-dials call center 820 using the original ANI, rather than modifying the ANI to represent a key (Step 909).

If call center 920 does support the modified ANI process, IVR 830 generates a key (Step 905) and transmits the key and user information to database 840 (Step 906). In an example, the key could be a sequence number that identifies the sequence of the current call within the context of multiple calls during a certain time period. Next, IVR 830 out-dials call center 820, including transmitting a modified ANI that indicates the key (Step 907). In an example, the ANI could be in the NPA-NXX-XXXX format whereby the last four digits XXXX are modified to represent the key. The ANI could be provided in the form of out of band signaling, such as signaling system 7 signaling. Alternatively, the ANI could be provided in-band in the form of dual-tone-multi-frequency (DTMF) tones.

Upon receiving the call and call signaling, call center 820 parses the key from the modified ANI and queries database 840 using the key. Database 840 retrieves and returns to call center 820 the user information stored in association with the key. In an example, the queries and responses comprise a transmission control protocol/internet protocol (TCP/IP) message exchange. Other types of well known database messaging are possible.

It should be understood that call center 820 or 825 could be configured to support the ANI modification process. In such a case, it may still be desirable for the call center system to obtain the original ANI of caller 831 or 832, even if the original ANI has been modified to indicate a key. Optionally, IVR 830 could also provide the original ANI to database 840 along with the key and user information. Thus, call center 820 or 825 could query database 840 for the original ANI based on the key received as the modified ANI.

In an embodiment, the user information obtained from database 840 could be further used to query a second database system for additional user information. For example, a caller could have provided a social security number to IVR 830, which in turn was stored in database 840. Upon retrieving the social security number from database 840, call center 820 could query the second database to obtain further information on the user. The additional information could then be provided to an agent workstation in the form of a screen pop displaying the additional information.

Advantageously, communication system 800 provides for uniquely identifying individual calls by keys, storing user information collected over the calls in association with the keys, and providing the keys to destination systems through the use of modified ANIs within call signaling transmissions. In an advantage, the need for expensive and inefficient back data channels is eliminated. In addition, the ability to correlate user information with calls originating from a common call system identifier is provided.

Computer System

Figure 10:
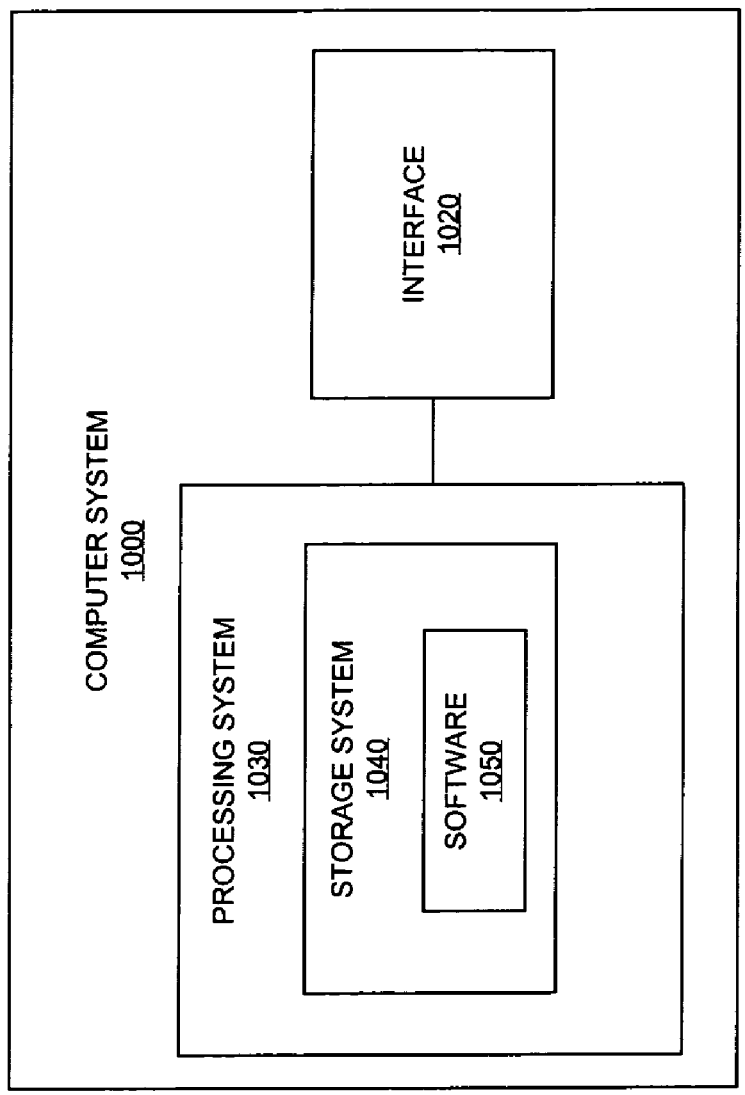
FIG. 10 illustrates a computer system in an embodiment of the invention.

FIG. 10 illustrates computer system 1000 in an embodiment of the invention. Computer system 1000 includes interface 1020, processing system 1030, storage system 1040, and software 1050. Storage system 1040 stores software 1050. Processing system 1030 is linked to interface 1020. Computer system 1000 could be comprised of a programmed general-purpose computer, although those skilled in the art will appreciate that programmable or special purpose circuitry and equipment may be used. Computer system 1000 may use a client server architecture where operations are distributed among a server system and client devices that together comprise elements 1020-1050.

Interface 1020 could comprise a network interface card, modem, port, or some other communication device. Signaling interface 1020 may be distributed among multiple communication devices. Interface 1030 could comprise a computer microprocessor, logic circuit, or some other processing device. Processing system 1030 may be distributed among multiple processing devices. Storage system 1040 could comprise a disk, tape, integrated circuit, server, or some other memory device. Storage system 1040 may be distributed among multiple memory devices.

Processing system 1030 retrieves and executes software 1050 from storage system 1040. Software 1050 may comprise an operating system, utilities, drivers, networking software, and other software typically loaded onto a general-purpose computer. Software 1050 could also comprise an application program, firmware, or some other form of machine-readable processing instructions. When executed by the processing system 1030, software 1050 directs processing system 1030 to operate as described for remote service testing systems 200, 400, and 500. Also when executed by the processing system 1030, software 1050 directs processing system 1030 to operate as described for call processing system 530 and IVR 830.

What is claimed is:

1. A call processing system comprising:
an interface configured to receive call signaling for a call from a call system and receive user information during the call from a user using the call system wherein the call signaling includes an identifier for the call system; and
a processing system configured to generate a sequence number for the call within a sequence of multiple calls, modify the identifier to generate a modified identifier indicating the sequence number, transfer the sequence number and the user information to a database system, and transfer new call signaling for the call to a destination wherein the new call signaling indicates the modified identifier.

2. The call processing system of claim 1 wherein the call signaling comprises automatic number identification (ANI) information and wherein the ANI information includes the identifier and wherein the processing system is configured to modify the ANI information to generate the modified identifier.

3. The call processing system of claim 2 wherein the identifier comprises a phone number for the call system and wherein the modified identifier comprises a modified phone number.

4. The call processing system of claim 3 wherein the processing system is configured to modify a portion of the phone number to generate the modified phone number having a modified portion.

5. The call processing system of claim 4 wherein the new call signaling comprises new automatic number identification (ANI) information indicating the modified phone number.

6. The call processing system of claim 5 wherein the modified portion of the modified phone number indicates the sequence number.

7. A method of operating a call processing system comprising:
receiving call signaling for a call from a call system and receive user information during the call from a user using the call system wherein the call signaling includes an identifier for the call system;
generating a sequence number for the call within a sequence of multiple calls;
modifying the identifier to generate a modified identifier indicating the sequence number;
transferring the sequence number and the user information to a database system; and
transferring new call signaling for the call to a destination wherein the new call signaling indicates the modified identifier.

8. The method of claim 7 wherein the call signaling comprises automatic number identification (ANI) information and wherein the ANI information includes the identifier and wherein the method comprises modifying the ANI information to generate the modified identifier.

9. The method of claim 8 wherein the identifier comprises a phone number for the call system and wherein the modified identifier comprises a modified phone number.

10. The method of claim 9 comprising modifying a portion of the phone number to generate the modified phone number having a modified portion.

11. The method of claim 10 wherein the new call signaling comprises new automatic number identification (ANI) information indicating the modified phone number.

12. The method of claim 11 wherein the modified portion of the modified phone number indicates the sequence number.

13. A communication system comprising:
a call processing system configured to receive call signaling for a call from a call system and receive user information during the call from a user using the call system wherein the call signaling includes an identifier for the call system, generate a sequence number for the call within a sequence of multiple calls, modify the identifier to generate a modified identifier indicating the sequence number, transfer the sequence number and the user information to a database system, and transfer new call signaling for the call to a destination system wherein the new call signaling indicates the modified identifier;
the database system coupled to the call processing system and configured to receive sequence number and user information, store the user information in association with the sequence number, receive a query indicating the sequence number, and transfer a response indicating the user information; and
a destination system coupled to the call processing system and the database system and configured to receive the new call signaling, transfer the query to the database system, and receive the user information from the database system in response to the query.

14. The communication system of claim 13 wherein the call signaling comprises automatic number identification (ANI) information and wherein the ANI information includes the identifier and wherein the call processing system is configured to modify the ANI information to generate the modified identifier.

15. The communication system of claim 14 wherein the identifier comprises a phone number for the call system and wherein the modified identifier comprises a modified phone number.

16. The communication system of claim 15 wherein the processing system is configured to modify a portion of the phone number to generate the modified phone number having a modified portion.

17. The communication system of claim 16 wherein the new call signaling comprises new automatic number identification (ANI) information indicating the modified phone number.

18. The communication system of claim 17 wherein the modified portion of the modified phone number indicates the sequence number.

19. The communication system of claim 13 wherein the call processing system comprises an interactive voice response (IVR) unit and wherein the destination system comprises a call center.

* * * * *